Oct. 12, 1926.  1,602,878
J. M. BROWN
REMOTE CONTROL MECHANISM
Filed March 5, 1921  3 Sheets-Sheet 2
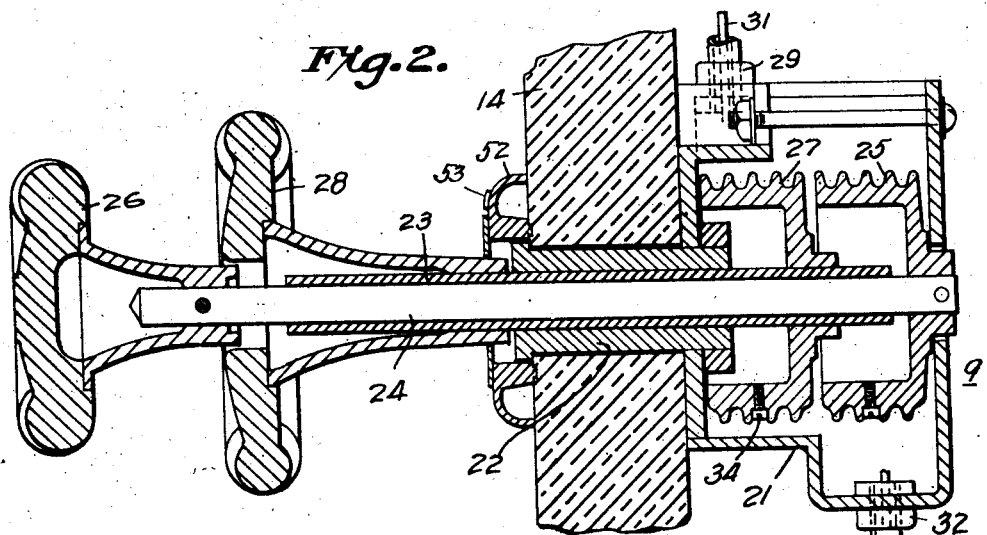
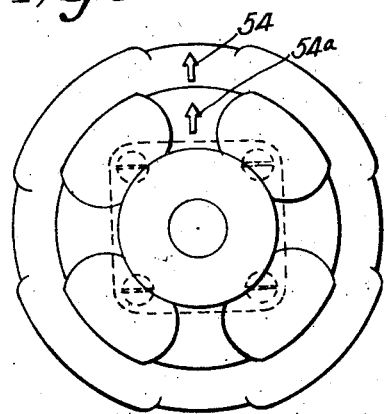
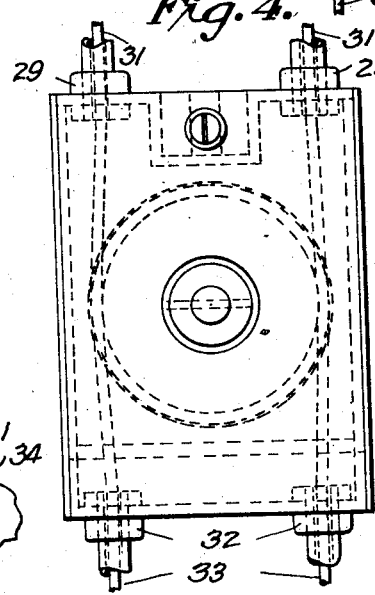
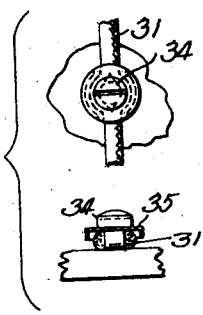
WITNESSES:
INVENTOR
James M. Brown,
BY
ATTORNEY Oct. 12, 1926.
J. M. BROWN
1,602,878
REMOTE CONTROL MECHANISM
Filed March 5, 1921  3 Sheets-Sheet 3
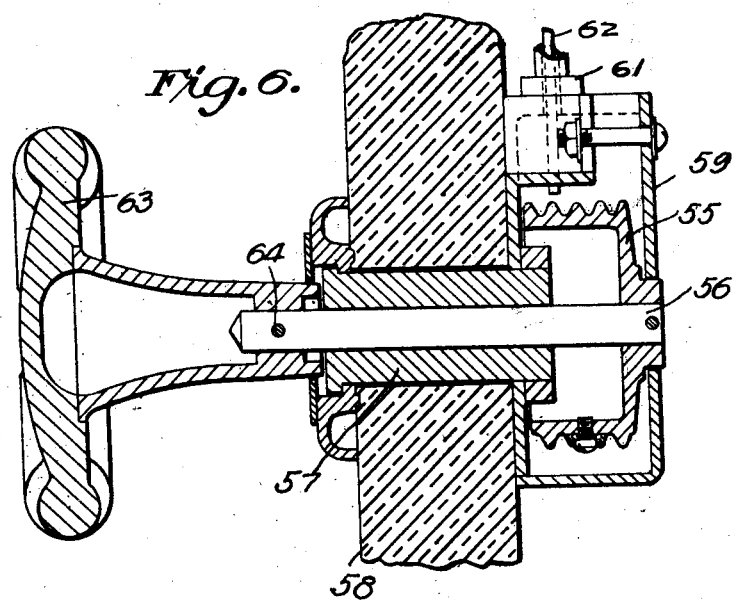
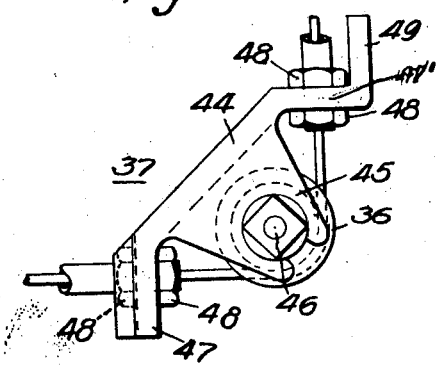
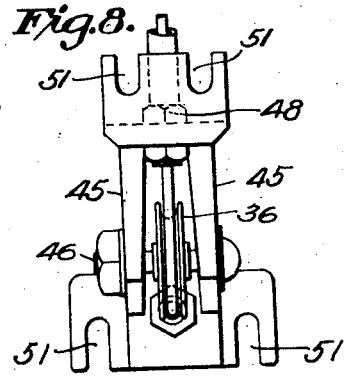
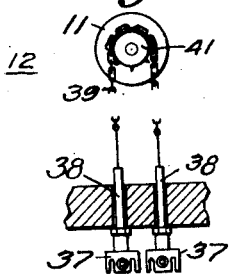
WITNESSES:
INVENTOR
James M. Brown.
BY
ATTORNEY Patented Oct. 12, 1926.

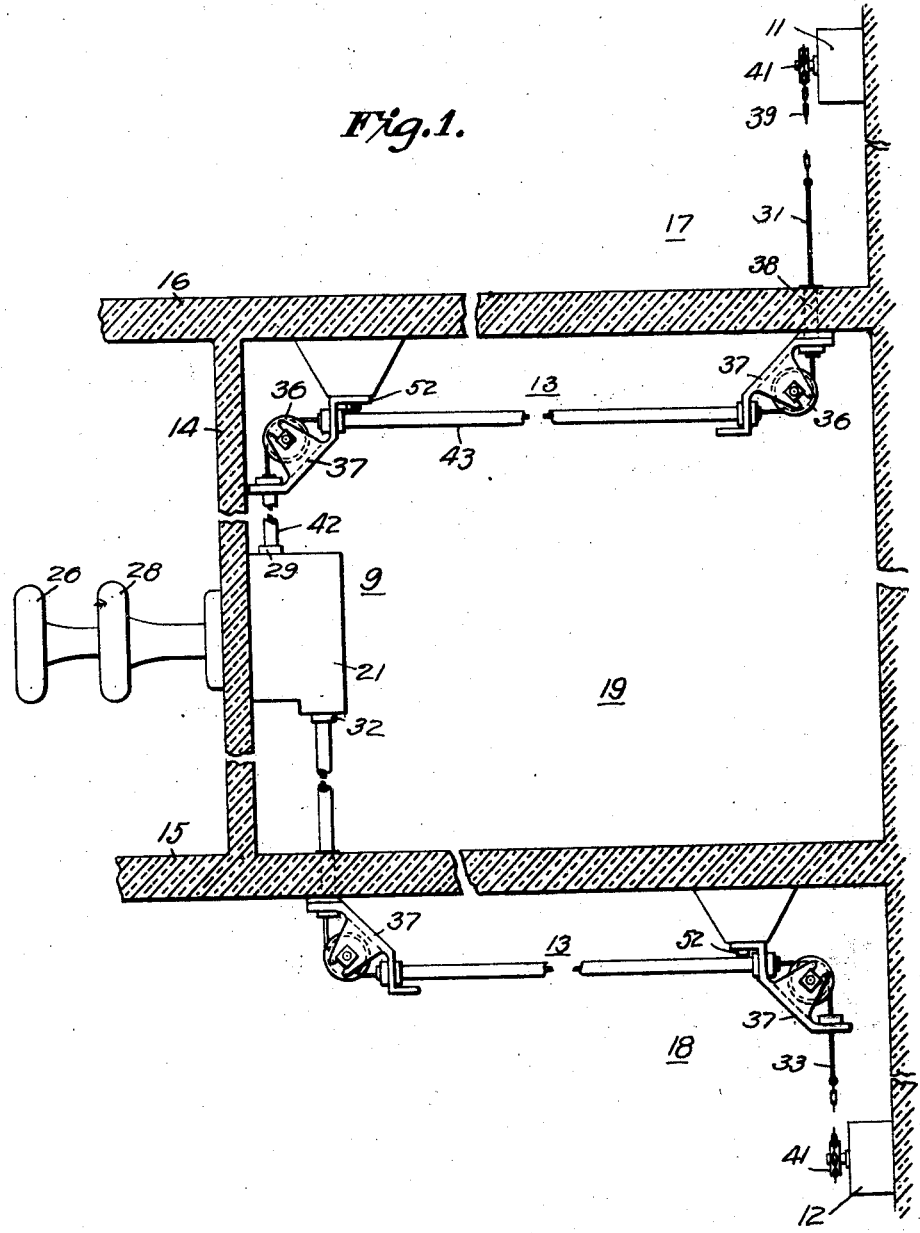

1,602,878

UNITED STATES PATENT OFFICE.

JAMES M. BROWN, OF PITTSBURGH, PENNSYLVANIA, ASSIGNOR TO WESTINGHOUSE ELECTRIC & MANUFACTURING COMPANY, A CORPORATION OF PENNSYLVANIA.

REMOTE CONTROL MECHANISM.

Application filed March 5, 1921. Serial No. 450,005.

My invention relates to remote-control mechanism and particularly to mechanism for operating a rheostat or other electrical control mechanism by means of an operating device that may be mounted upon a switch board located at a remote point and in another room.

One object of my invention is to provide an operating mechanism for remotely-located rheostats or other controlling device that is adaptable to a great variety of installation conditions without necessitating special equipment.

Another object of my invention is to provide a control system, having the above characteristics, wherein the operation is positive and wherein the mechanical connections between the operating devices and the controlling devices are protected against any possibility of coming into contact with any equipment and accessories installed on or about the switchboard.

A further object of my invention is to provide a control system wherein the connector supports of the system are interchangeable and are adaptable to a variety of relations with the supporting structure whereby the connector may be directed in any desired direction.

A further object of my invention is to provide a control system wherein the mechanism is simple and may readily be manufactured, assembled, inspected and repaired.

These and other objects, that will be made apparent throughout the further description of the invention, are attained by means of the control system hereinafter described, and illustrated in the accompanying drawings, wherein:—

Figure 1 is a semi-diagrammatic view of the control system showing various elements thereof in side elevation and the walls of the supporting structures and rooms in cross-section.

Fig. 2 is a longitudinal section through the operating mechanism of the system.

Fig. 3 is a front view of the operating handle.

Fig. 4 is a rear view of the operating mechanism.

Fig. 5 shows plan and elevational views of a fragment of the operating windlass.

Fig. 6 is a longitudinal section from a modified form of the operating device.

Figs. 7 and 8 are side and front elevational views, respectively, of a shaft and a bracket employed in supporting the operating cable and enclosing conduit of the system, and Fig. 9 is a front view of an assembly of a portion of the apparatus.

Referring to the drawings, and particularly to Fig. 1 wherein the complete system is illustrated, the apparatus includes an operating device 9, rheostats 11 and 12 and flexible cable systems 13 for transmitting movements of the operating device to the rheostats. In the installation illustrated, the operating device is mounted upon a switchboard 14 which extends between the floor walls 15 and 16 of a building. The rheostats 11 and 12 are disposed, respectively, in rooms 17 and 18 that are disposed above and below the rooms 19 in which the switchboard is mounted.

The bus bars and accessories of the switchboard are usually mounted upon the rear side of the board and, in many instances, it is not expedient to insulate every current-conducting element of the electrical system. It is, therefore, necessary that any appliances, such as the remote-control mechanism herein illustrated, be so protected that it is impossible for any parts, which might become broken or disconnected from the system, to fall across the various conductors at the rear of the board. To prevent such an occurrence, the operating cables of the system are enclosed in suitable conduits, in a manner to be hereinafter described.

It is an object of this invention to operate either of the rheostats 11 and 12 independently by means of a single operating device 9. Referring to Fig. 2, wherein the preferred form of operating device is illustrated, the device comprises a housing 21 that is secured to the rearside of the switch board 14 and is provided with a bearing bushing 22 in which a tubular shaft 23 is rotatably supported. A second or interior shaft 24 is rotatably mounted within the tubular shaft 23 and extends beyond the ends of the said shaft for the purpose of receiving, at one end, an operating windlass 25 and, at the other end, an operating handle 26. An operating windlass 27 is secured to the inner end of the tubular shaft 23, and a handle 28 is secured to the outer end of the shaft for the purpose of imparting rotary movement thereto and to the windlass 27.

The housing 21 is provided with two tubular bushings 29 through which the flexible cable 31 operates. The lower portion of the housing 21 is provided with a pair of tubular bushings 32 through which a flexible operating cable 33 operates.

The cable 31 is secured, at its middle portion, to the windlass 27 by means of a screw 34 and a clamping washer 35, the manner of connection being clearly illustrated in Fig. 5. The cable is wound, in one or two turns, about the windlass 27, and the ends thereof extend out of the housing through the bushings 29 and are supported, adjacent the underside of the floor 16, upon anti-friction pulleys 36 that are mounted upon brackets 37 which are secured to the underside of the floor 16. After passing the pulleys 36, the cable is extended horizontally to a similar pulley and bracket device located at the opposite side of the room 19 for the purpose of directing the cable in a plane at right angles to the transversely extending section of the cable. The ends of the cable 31 are passed through the bushings 38 provided in the floor 16 and are connected to the ends of a sprocket chain 39 which operatively engages a sprocket 41 that is secured to the rotary operating shaft of the rheostat 11, in the manner illustrated in Fig. 9.

It will be seen from the foregoing that, when the operating handle 28 is rotated, the windlass 27 will cause the one end of the cable 31 to be placed under tension and to pull one end of the sprocket chain 39 downward thereby causing the rheostat-operating shaft to be rotated a corresponding amount. Operation of the handle 28 in the opposite direction will place the other end of the operating cable 31 under tension and thereby cause a reversed movement of the rheostat 11.

The cable 31 is enclosed between the housing 21 and the bracket 37 by means of a metal conduit 42, and the horizontal section of the cable is enclosed by means of conduits 43 that connect the brackets 37. If the cable should be broken accidentally, the conduits will prevent it from falling across any of the exposed electric conductors on the switchboard or in the room 19.

The rheostat 12 is connected to the windlass 25 by means of the cable 33, in a manner similar to that just described, the bracket 37 for supporting the cables being similar in every respect to those employed for supporting the cable 31.

The brackets 37, referring to Figs. 7 and 8, are so designed that they may be used to support the operating cables or connectors in any desired position so that they may be used in a great variety of installation conditions. Each bracket consists of a body portion 44 that is provided with two spaced webs 45 upon which the pulley 36 is mounted for rotation about a shaft 46. The body 44 is provided with two extensions 47 and 47' disposed at right angles to each other. These extensions are provided with perforations for receiving the threaded ends of the conduit which is attached to the bracket by means of threaded nuts 48. One of the extensions is provided with an angularly disposed attaching web 49 having an attaching face disposed in a plane parallel to the plane of the attaching face of the extension 47. The extension 47 and the attaching web 49 are each provided with slots 51 for the purpose of receiving attaching bolts 52.

By reference to Fig. 1, it will be seen that the brackets, by reason of the construction of the attaching faces just described, may be so positioned with relation to one another that the cable may be directed in any desired direction.

An annular dial member 52 surrounds the tubular shaft 23 and is secured to the outer face of the switchboard 14. The dial member is provided with legends 53 arranged radially about the axis of rotation of the shaft 23 for the purpose of indicating the direction in which the operating handle should be rotated in order to reduce or increase the voltage of the current controlled by the rheostats. As the cable is positively connected to the windlass and is in positive driving connections with the rheostats through the medium of the sprockets 41, movement of either windlass will cause a corresponding movement of the rheostat connected thereto. Legends in the shape of arrows 54 and 54$^a$ are placed upon the hand wheels 28 and 26, respectively, for the purpose of indicating the degree of movement of either handle from a predetermined normal position. If the movement of the operating handles and the rheostat-operating shaft are in direct proportion, and the extreme limit of movement of the rheostat shaft is through 90°, then it will be apparent that, when either handle is turned 90° from a predetermined position, the rheostat will be moved a proportional distance. By reason of this arrangement, the position of the rheostat may be determined by determining the position of the arrows on the handles with respect to a predetermined point.

In Fig. 6, I have illustrated a modified form of operating mechanism wherein but a single windlass 55 is employed. The construction is substantially similar to that of the operating devices previously described except that provision is necessary for but one operating shaft and one windlass. A shaft 56 is rotatably mounted in a bushing 57 that is secured to a switchboard 58. The windlass is enclosed by means of a housing 59 that is provided with tubular bushings 61 through which the ends of the operating cable 62 extend.

A handle 63 is secured to the outer end of the shaft 56 by means of a tapered pin 64. Where it is desired to operate but one rheostat, this form of operating handle is employed. It will be seen from the foregoing that the construction is simple and inexpensive and that the rheostat is positively connected through the operating mechanism and that there is no danger of parts of the mechanism becoming detached from the system and falling across the live conductors associated with the switchboard.

While I have described and illustrated but two embodiments of my invention, it will be apparent to those skilled in the art that various changes, modifications, substitutions, additions and omissions may be made in the apparatus illustrated without departing from the spirit and scope of the invention, as set forth in the appended claims.

I claim as my invention:—

1. In a remote control device, a sheave bracket for control conduits comprising a frame structure for supporting the sheave and having angularly disposed conduit attaching faces and a pair of bracket attaching faces disposed in offset substantially parallel planes that are substantially parallel to the axis of the sheave.

2. In a remote control device, a sheave bracket for control conduits comprising a frame structure for supporting the sheave and having a pair of bracket attaching faces disposed in offset substantially parallel planes that are substantially parallel to the axis of the sheave.

3. In a remote control device, a sheave bracket for control conduits comprising a frame structure for supporting the sheave and having a pair of bracket attaching faces disposed in offset substantially parallel planes that are substantially parallel to the axis of the sheave and provided with slots extending inwardly from opposite ends of the respective faces.

In testimony whereof, I have hereunto subscribed my name this 26th day of February 1921.

JAMES M. BROWN.